Jan. 28, 1969  AKIRA YANASE ET AL  3,424,687
FERROMAGNETIC MATERIAL
Filed Sept. 15, 1965

INVENTORS
AKIRA YANASE
YOSHIO TAWARA
ATSUSHI IGA
HOZUMI HIROTA

BY *Wenderoth, Lind & Ponack*

ATTORNEYS

United States Patent Office 3,424,687
Patented Jan. 28, 1969

3,424,687
FERROMAGNETIC MATERIAL
Akira Yanase, Yoshio Tawara, Atsushi Iga, and Hozumi Hirota, Osaka-fu, Japan, assignors to Matsushita Electric Industrial Co., Ltd., Osaka, Japan, a corporation of Japan
Filed Sept. 15, 1965, Ser. No. 487,356
Claims priority, application Japan, Oct. 6, 1964, 39/57,499
U.S. Cl. 252—62.51        8 Claims
Int. Cl. C04b 35/26

ABSTRACT OF THE DISCLOSURE

Compositions of the formula $$Mn_{3-x}Me_xB_4$$

wherein Me is Co and Ni which can be replaced in part by Fe, possess magnetic properties which are characterized by a steep rise in magnetic moment with decreasing temperature, provided $0.02 < x < 0.50$. The compositions are especially useful for application to thermomechanical elements of magnetic thermal switches.

---

This invention relates to novel ferromagnetic compositions of matter, corresponding to the chemical formula $$Mn_{3-x}Me_xB_4$$

which are especially useful for application to thermo-mechanical elements of magnetic thermal switches.

It has been discovered, according to the present invention, that the new compositions indicated by the aforesaid formula $$Mn_{3-x}Me_xB_4$$

wherein Me is at least one of Ni, Co and Fe, possess unexpected and significant magnetic properties which are characterized by a step rise in magnetic moment with decreasing temperature, and are especially suitable for use in thermo-mechanical elements of magnetic thermal switches.

Crystals of $Mn_{3-x}Me_xB_4$ are obtained by heating a mixture of ingredient metal powders under reduced pressure, and exist in an orthorhombic structure belonging to the space group $D7_b$, so-called $Ta_3B_4$ type. R. Kiessling reported that the intermetallic compound $Mn_3B_4$ has a crystal structure of the $Ta_3B_4$ type with the lattice constant $a=3.032$ A., $b=12.86$ A., $c=2.960$ A. (Acta. Chem. Scand., 4 (1950) 146).

The present inventors have found that $Mn_3B_4$ is an antiferromagnet having the Neel temperature at 120° C., and does not show any ferromagnetism above $-200°$ C. (J. Phys. Soc. Japan 20 (1965)).

This invention is a further development of the aforesaid investigations, and is based on the unexpected and significant magnetic properties of compositions obtained by modifying $Mn_3B_4$ by a partial replacement of Mn therein by one or more metals selected from the group consisting of Co, Ni and Fe.

The procedure is as follows:

Powdered electrolytic manganese, powdered boron and powdered nickel, cobalt and/or iron are weighed out in a given proportion, mixed intimately, and pressed into small tablet form, advantageously 10 mm. in diameter and 10 mm. in height, at 500 kg./cm.² These tablets are then heated under reduced pressure below $10^{-2}$ mm. Hg to red heat (550° C. to 950° C.) for a few minutes, after which they are sealed in evacuated quartz tubes and sintered for 50 hours at 1150° C. Each of the ingredients initially contains a small amount of oxygen in the form of its oxide. The amount of oxygen decreases after sintering because the oxygen in each ingredient forms $B_2O_3$ upon heating the mixture, and $B_2O_3$ easily evaporates off. Therefore, the boron content in the starting mixture is made higher than the desired boron content of the heated resultant compositions. It is necessary that the starting content of boron should range from 57 atomic percent to 61 atomic percent for the formation of a single phase (mutual solid solution) of the $Ta_3B_4$ type. Detailed features of the present invention will be explained with reference to the accompanying sheets of drawing, wherein FIG. 1 shows magnetic moments of, for example, $Mn_{2.73}Ni_{0.27}B_4$ and $Mn_{2.64}Ni_{0.36}B_4$ as functions of temperature;

Following are descriptions of presently preferred illustrative embodiments of the invention.

Figure 1:
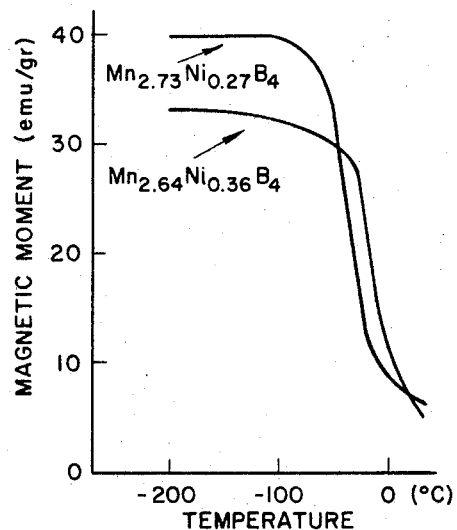

(1) By way of example, a mixture consisting of 36.4 atomic percent of manganese, 3.6 atomic percent of nickel and 60.0 atomic percent of boron, is sintered by the method described above. Powder X-ray diffraction lines of the specimen are exactly indexed as an orthorhombic lattice of the $Ta_3B_4$ type with $a=3.036$ A., $b=12.80$ A., $c=2.961$ A. The specimen is in an atomic proportion indicated by the formula $$Mn_{2.73}Ni_{0.27}B_4$$
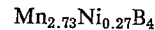

when it is subjected to magnetic measurements, according to a per se well-known method, in a magnetic field of 15,000 oe., a steep rise of the magnetic moment is observed at about $-24°$ C., as shown in FIG. 1. No thermal hysteresis is observed. These properties render the composition especially suitable for use in thermo-mechanical elements of magnetic switches in this temperature range.

(2) As a further example, a specimen having the atomic proportion indicated by the chemical formula $$Nn_{2.64}Ni_{0.36}B_4$$

is obtained by sintering a pressed mixture consisting of 35.2 atomic percent of manganese, 4.8 atomic percent of nickel and 60.0 atomic percent of boron, in exactly the same way as that above described. A steep rise in the magnetic moment of this specimen is observed at about $-8°$ C., as shown in FIG. 1, and no thermal hysteresis is observed. These properties are especially suitable for use of the composition in thermo-mechanical elements of magnetic switches in this temperature range.

Figure 2:
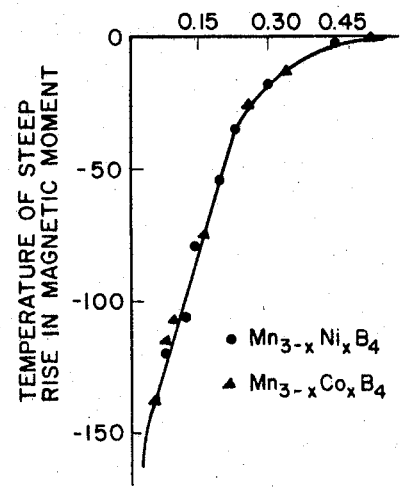
FIG. 2 shows the temperatures of steep rise in magnetic moment of $Mn_{3-x}Ni_xB_4$ and $Mn_{3-x}Co_xB_4$.

The temperature of a steep rise in magnetic moment varies with the ratio of Mn to Ni in $Mn_{3-x}Ni_xB_4$, as indicated in FIGS. 1 and 2. Since the lattice constant of $Mn_{3-x}Ni_xB_4$ decreases linearly with increasing content of Ni, as shown in Table 1, $Mn_{3-x}Ni_xB_4$ clearly exists in a single phase solid solution in the range of $x=0$ to $x=0.36$.

TABLE 1

| Composition | Lattice Constant (A.) | | |
|---|---|---|---|
| | a | b | c |
| $Mn_3B_4$ | 3.038 | 12.85 | 2.960 |
| $Mn_{2.94}Ni_{0.06}B_4$ | 3.037 | 12.83 | 2.962 |
| $Mn_{2.805}Ni_{0.195}B_4$ | 3.037 | 12.82 | 2.962 |
| $Mn_{2.73}Ni_{0.27}B_4$ | 3.036 | 12.80 | 2.961 |
| $Mn_{2.64}Ni_{0.36}B_4$ | 3.034 | 12.79 | 2.960 |

When $x$ in $Mn_{3-x}Ni_xB_4$ becomes greater than 0.36, the critical temperature is slightly above $-8°$ C. for $Mn_{2.64}Ni_{0.36}B_4$, and ultimately reaches 0° C. A second phase appears in the compositions wherein $x$ is greater than 0.50. This phase is non-magnetic and results in impairment of the property characterized by steep rise in magnetic moment with decreasing temperature.

Since the temperature of a steep rise in magnetic moment can be exactly controlled by the value of $x$ in $Mn_{3-x}Ni_xB_4$, the compositions indicated by $Mn_{3-x}Ni_xB_4$ are especially suitable for thermo-mechanical elements of magnetic switches. Switching temperatures below $-10°$ C. are covered by the composition indicated by the formula $$Mn_{3-x}Ni_xB_4$$

wherein $0 < x < 0.36$, and those below $0°$ C. are covered by the composition of the formula $$Mn_{3-x}Ni_xB_4$$

wherein $0 < x < 0.50$.

(3) By way of further examples, samples of $$Mn_{3-x}Co_xB_4$$

are prepared in exactly the same way as that hereinbefore described. It is thus found, according to the present invention, that $Mn_{3-x}Co_xB_4$ exhibits essentially the same thermo-magnetic properties as those of $Mn_{3-x}Ni_xB_4$; for instance the temperature of a steep rise in magnetic moment is exactly the same for $Mn_{3-x}Ni_xB_4$ and $Mn_{3-x}Co_xB_4$ for the same values of $x$. This is clearly understood from FIG. 2, which shows the temperature of steep rise in magnetic moment for both compositions.

Figure 3:
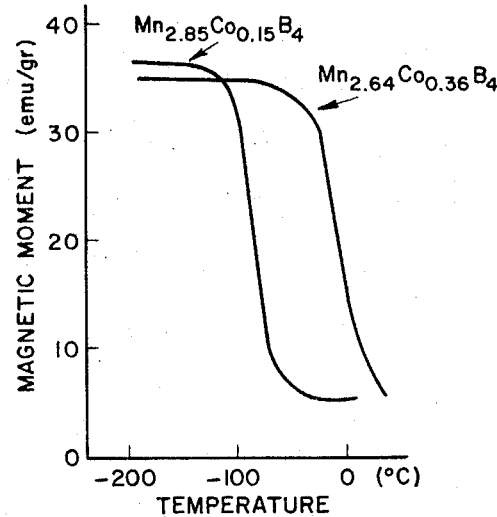
FIG. 3 shows magnetic moments of, for example, $Mn_{2.85}Co_{0.15}B_4$ and $Mn_{2.64}Co_{0.36}B_4$ as functions of temperature.

Thermo-magnetic properties of, for example, $$Mn_{2.85}Co_{0.15}B_4 \text{ and } Mn_{2.64}Co_{0.36}B_4$$

are shown in FIG. 3.

Thermo-magnetic properties of the compositions indicated by the formula $$Mn_{3-x}Co_xB_4$$

render these compositions also especially suitable for use in thermo-mechanical elements of magnetic switches. Switching temperatures below $-10°$ C. are covered by the composition indicated by the formula $$Mn_{3-x}Co_xB_4$$

wherein $0 < x < 0.36$, and those below $0°$ C. are covered by the composition $Mn_{3-x}Co_xB_4$, wherein $0 < x < 0.50$.

Moreover, it has also been found, according to the present invention, that the compositions expressed by the chemical formula $$Mn_{3-x-y}Ni_xCo_yB_4$$

show steep rises in magnetic moment at the temperature which depends only on the value of $x+y$. A second phase appears in the compositions wherein $x+y$ is greater than 0.50. This phase results in impairment of the property characterized by steep rise in magnetic moment.

The Ni or Co component in $Mn_{3-x}Ni_xB_4$ or $Mn_{3-x}Co_xB_4$ can be partially replaced by Fe without changing the aforedescribed properties of steep rise in magnetic moment.

The steep rise in the magnetic moment of the specimens containing Fe in place of Ni or Co takes place at lower temperature than in the case of the unchanged specimens. The switching temperature of the thermo-mechanical element can be changed by this modification. When the value of $x$ in the formula $$Mn_{3-x-y}Ni_xFe_yB_4 \text{ or } Mn_{3-x-y}Co_xFe_yB_4$$

becomes smaller than 0.02, no ferromagnetism is observed in the temperature range above $-200°$ C. A second phase appears in the compositions wherein $x+y$ is greater than 0.50. This phase results in impairment of the property characterized by steep rise in magnetic moment.

As mentioned above, the compositions indicated by the formulae $$Mn_{3-x}Ni_xB_4$$
$$Mn_{3-x}Co_xB_4$$
$$Mn_{3-x-y}Ni_xFe_yB_4$$
$$Mn_{3-x-y}Co_xFe_yB_4 \text{ and}$$
$$Mn_{3-x-y}Ni_xCo_yB_4$$

exhibit steep rises in magnetic moment at temperatures depending on the value of $x$ and $y$, and are especially suitable for use in thermo-mechanical elements which are used in magnetic thermal switches for temperature control.

Prior compositions differing from the present compositions are usually bound up with a thermal hysteresis for a steep change in magnetic moment, as disclosed in U.S. Patents Nos. 3,126,347, 3,144,324 and 3,144,325. No thermal hysteresis, however, is observed in the thermo-magnetic properties of the compositions of the present invention, and this is an important characteristic for a thermo-mechanical element.

What is claimed is:

1. A ferromagnetic composition consisting essentially of a mutual solid solution having atomic proportions indicated by the formula:

$$Mn_{3-x}Me_xB_4$$

wherein Me is at least one member selected from the group consisting of nickel and cobalt, and $0.02 < x < 0.50$.

2. A ferromagnetic composition consisting essentially of a mutual solid solution having atomic proportions indicated by the formula:

$$Mn_{3-x}Ni_xB_4$$

wherein $0.02 < x < 0.50$.

3. A ferromagnetic composition consisting essentially of a mutual solid solution having atomic proportions indicated by the formula:

$$Mn_{3-x}Co_xB_4$$

wherein $0.02 < x < 0.50$.

4. A ferromagnetic composition consisting essentially of a mutual solid solution having atomic proportions indicated by the formula:

$$Mn_{3-x-y}Ni_xFe_yB_4$$

wherein $0.02 < x+y < 0.50$.

5. A ferromagnetic composition consisting essentially of a mutual solid solution having atomic proportions indicated by the formula:

$$Mn_{3-x-y}Co_xFe_yB_4$$

wherein $0.02 < x+y < 0.50$.

6. A ferromagnetic composition consisting essentially of a mutual solid solution having atomic proportions indicated by the formula:

$$Mn_{3-x-y}Co_xNi_yB_4$$

wherein $0.02 < x+y < 0.50$.

7. A ferromagnetic composition consisting essentially of a mutual solid solution having atomic proportions indicated by the formula:

$$Mn_{2.73}Ni_{0.27}B_4$$

8. A ferromagnetic composition consisting essentially of a mutual solid solution having atomic proportions indicated by the formula:

$$Mn_{2.64}Ni_{0.36}B_4$$

References Cited

Chemical Abstracts, vol. 53, p. 19, 497b, 1959; vol. 58, p. 8508b, 1963.

TOBIAS E. LEVOW, *Primary Examiner.*

R. D. EDMONDS, *Assistant Examiner.*